W. C. SMITH.
TYPE SETTING AND DISTRIBUTING MACHINE.
APPLICATION FILED NOV. 3, 1916.
1,279,469.
Patented Sept. 17, 1918.
10 SHEETS—SHEET 7.
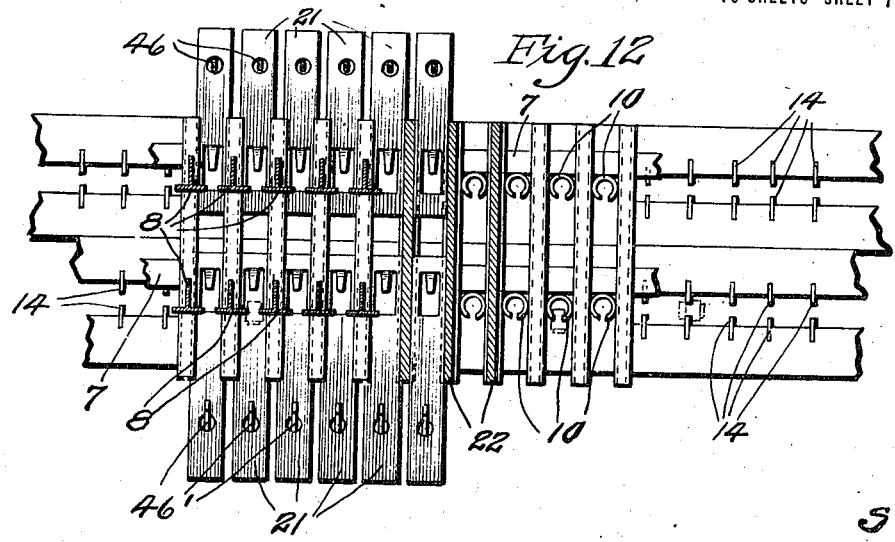
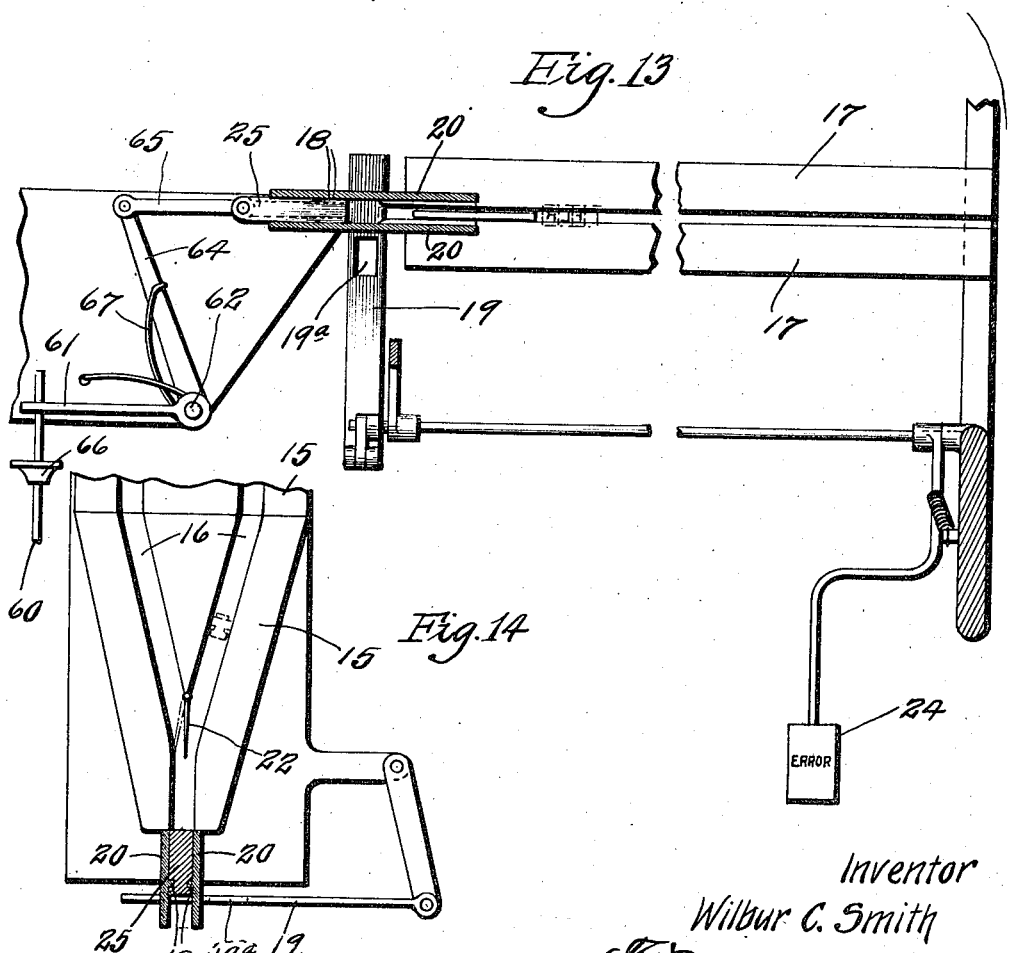
Inventor
Wilbur C. Smith
By J. R. Cornwall, Atty.

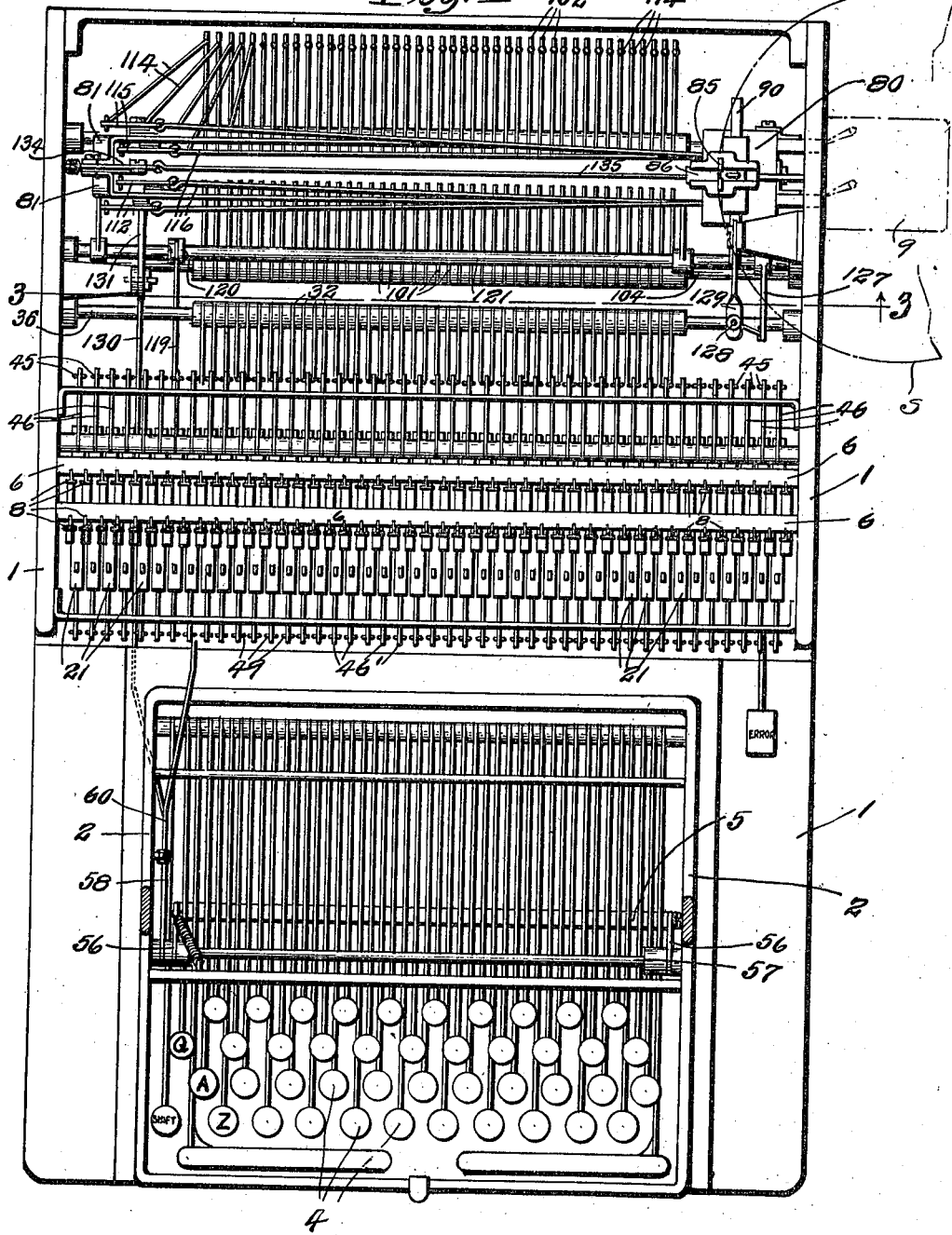

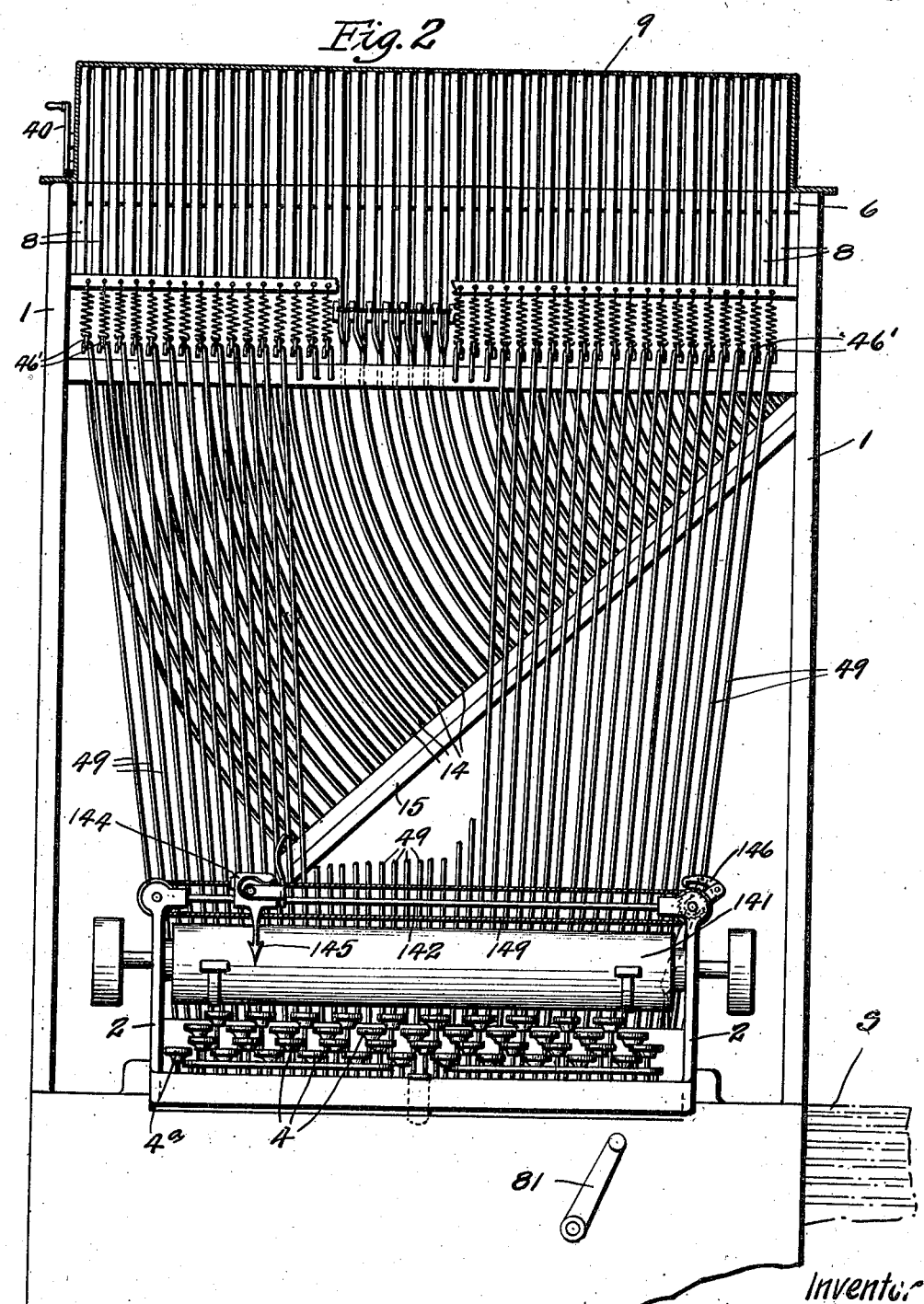

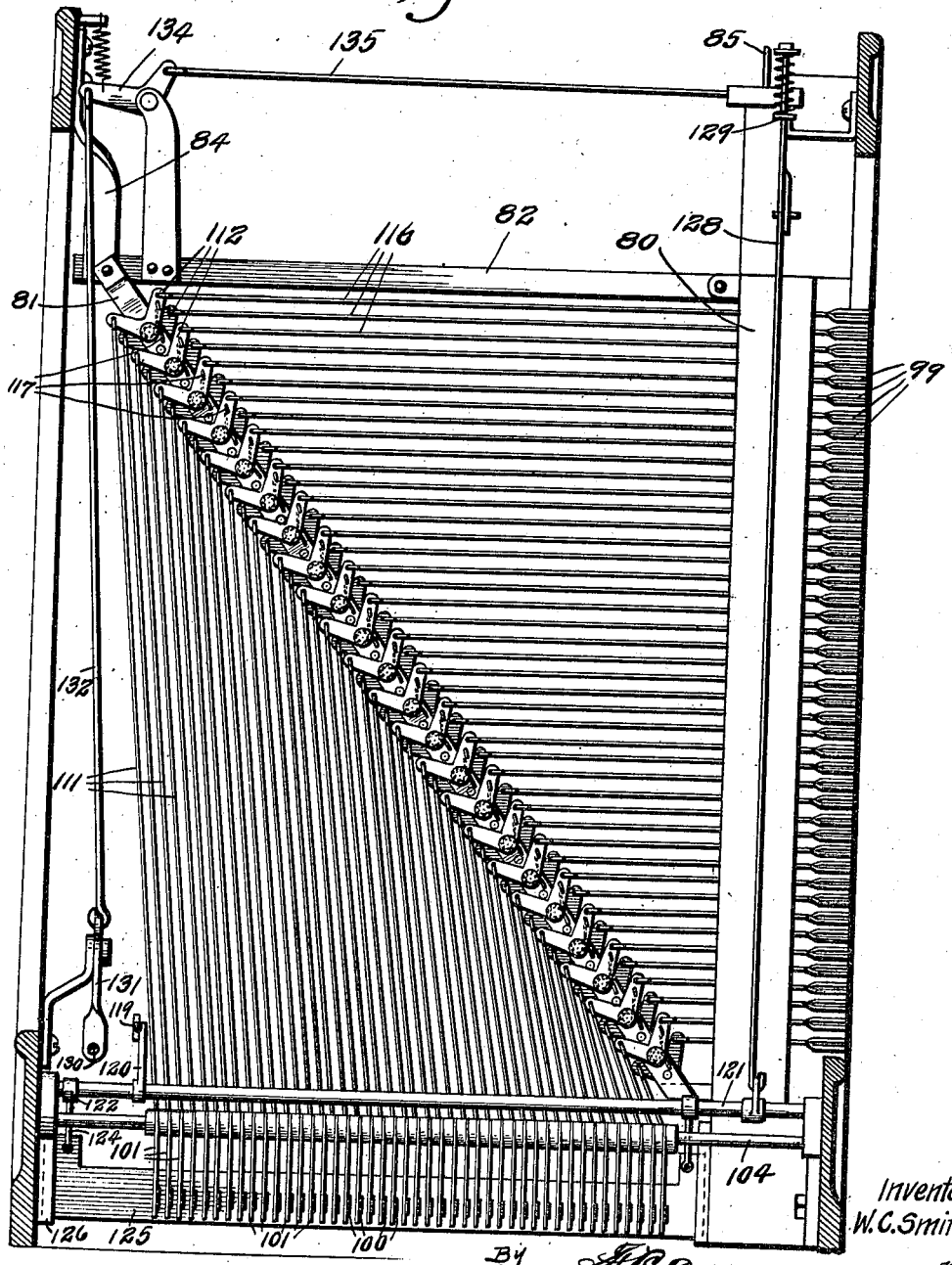

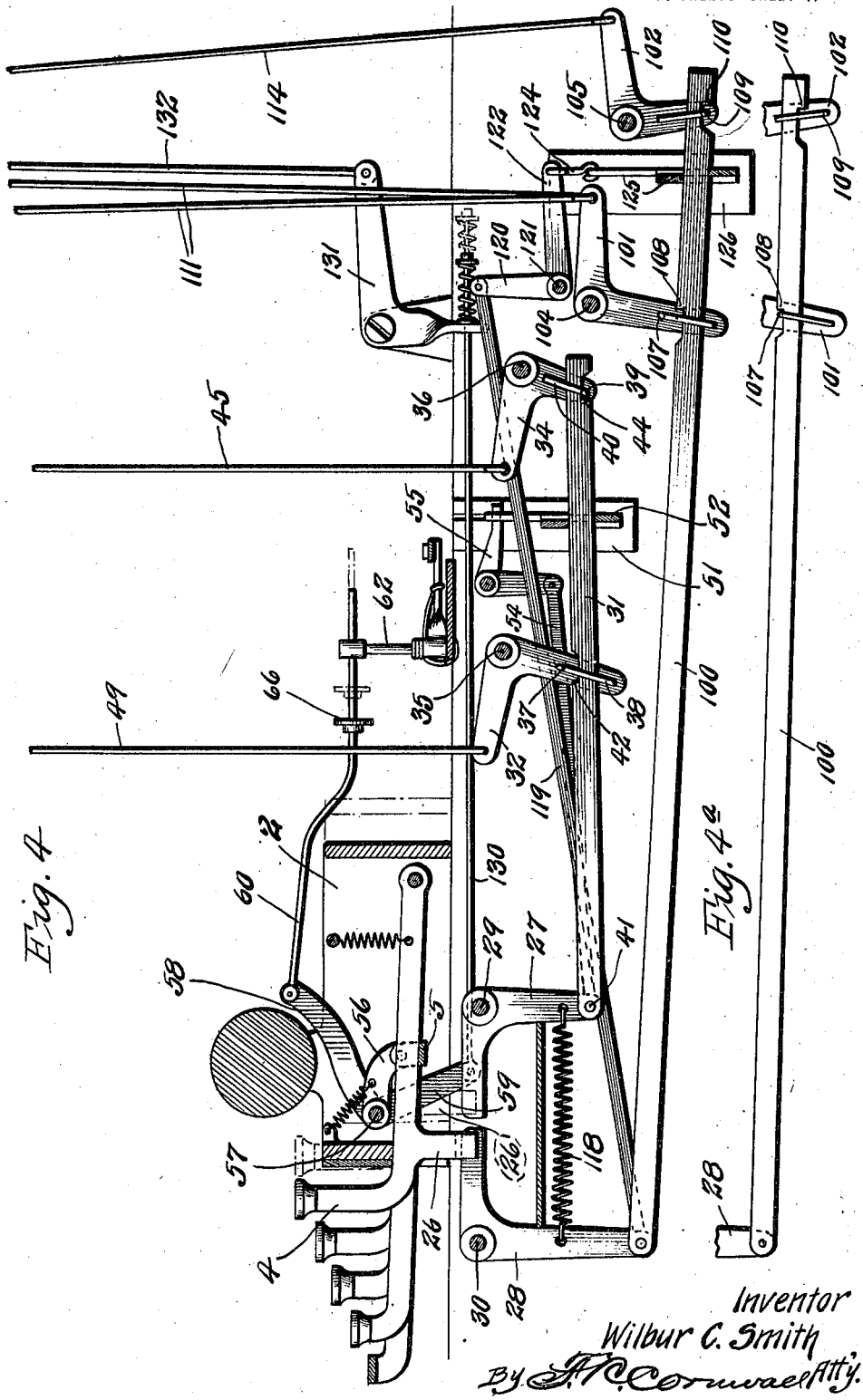

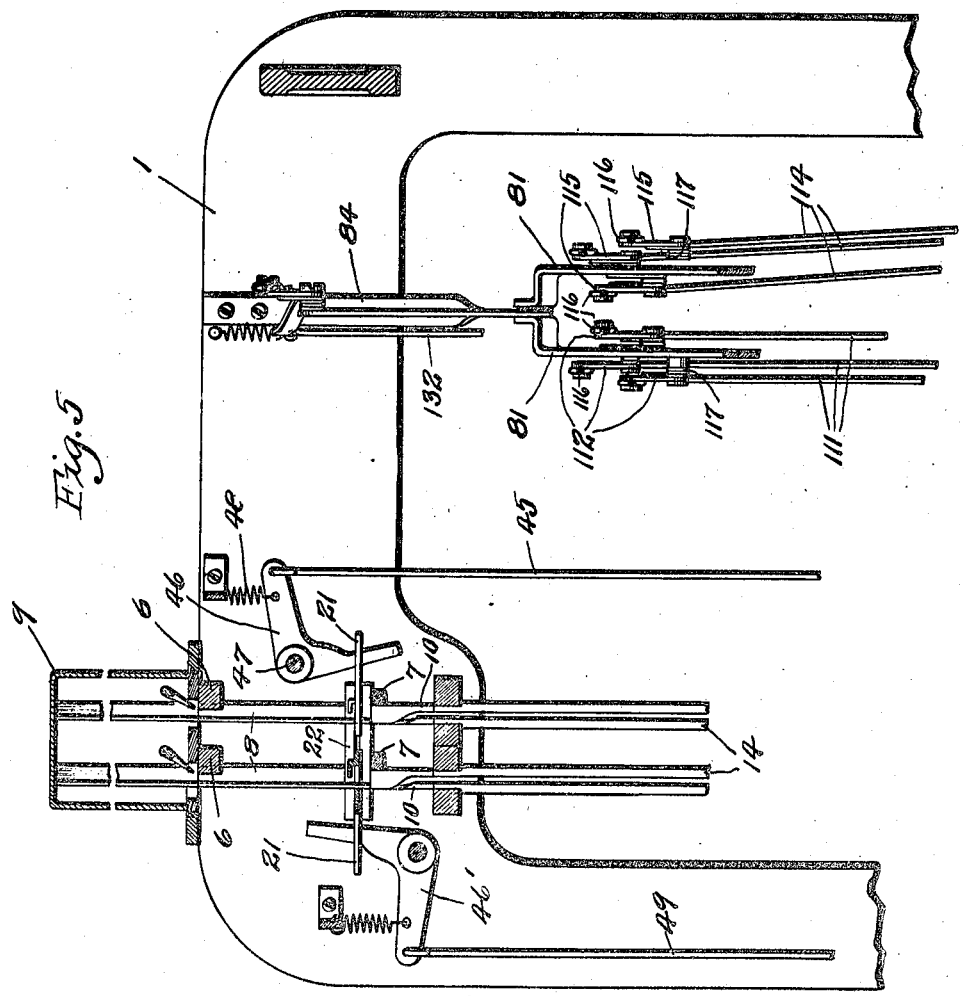
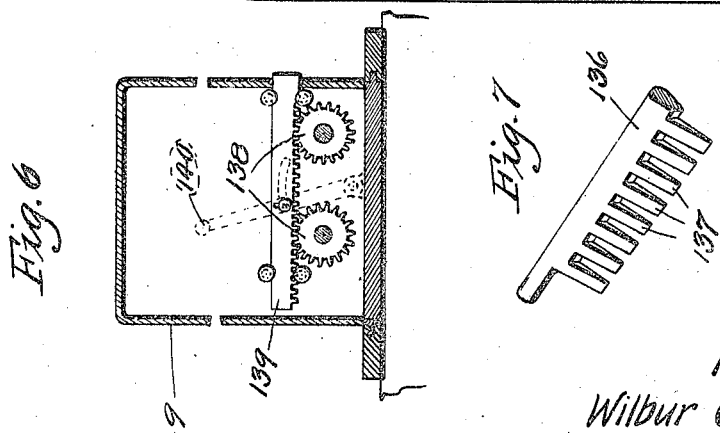

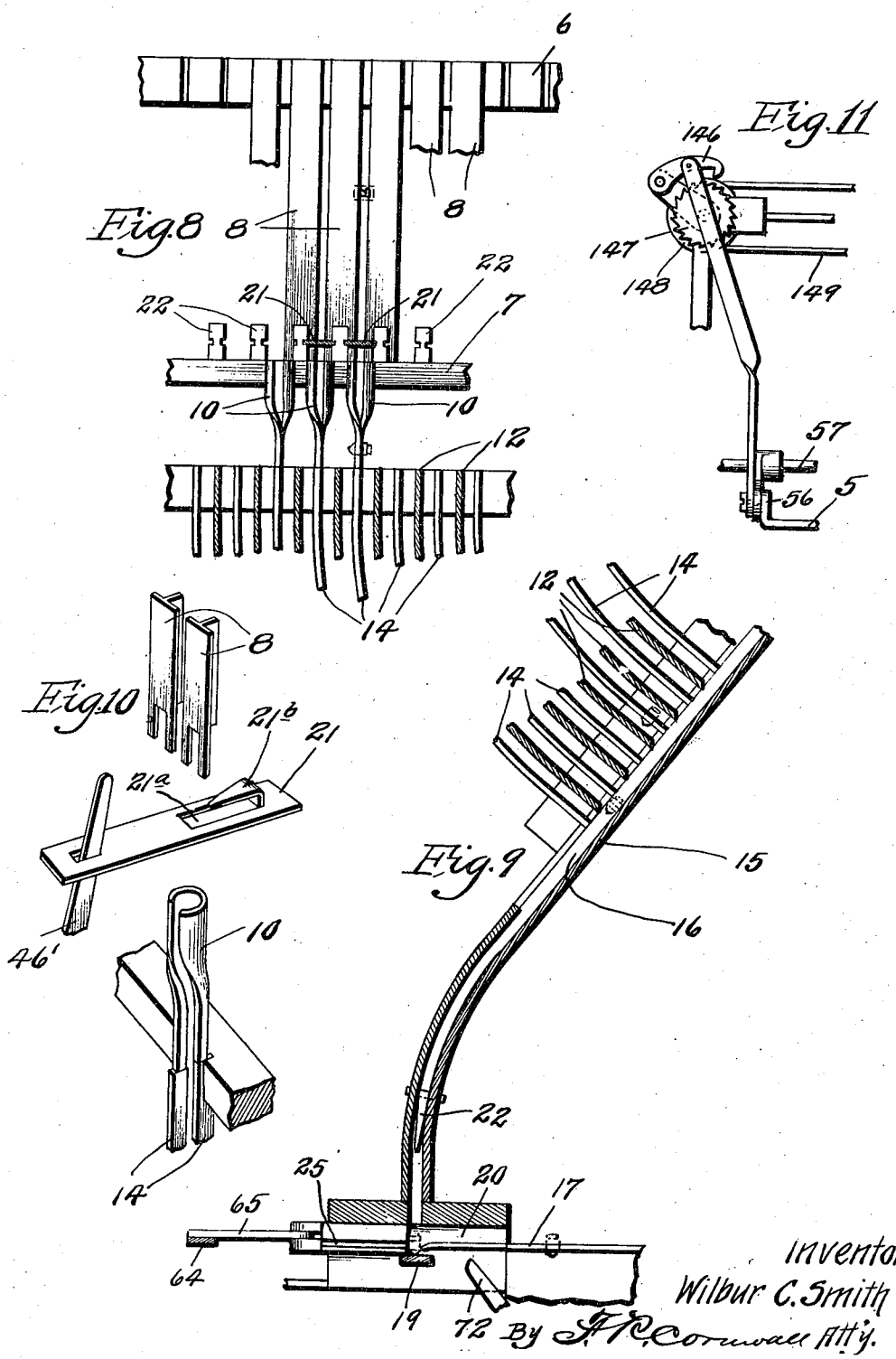

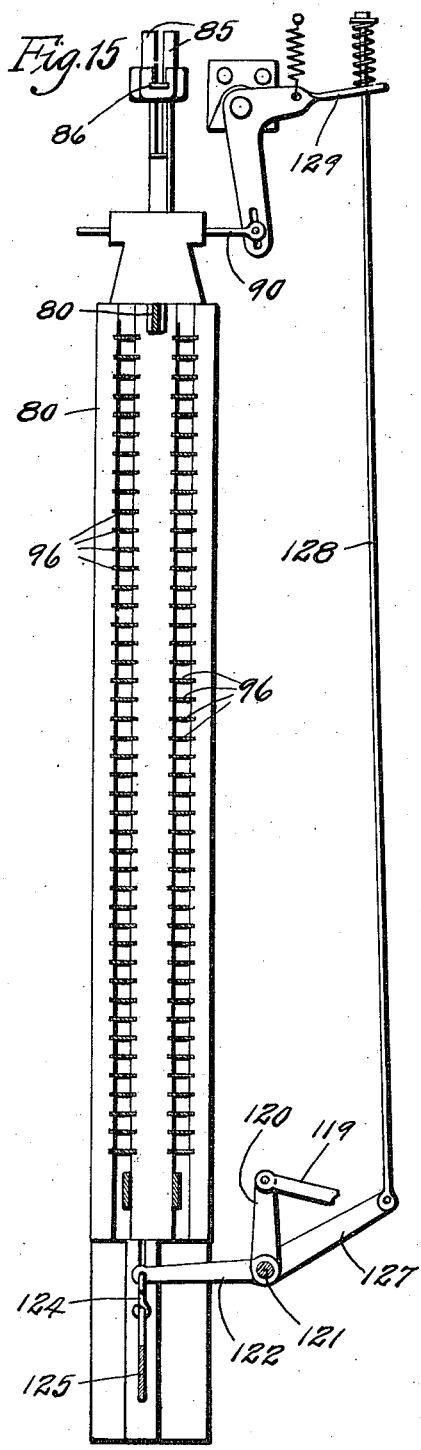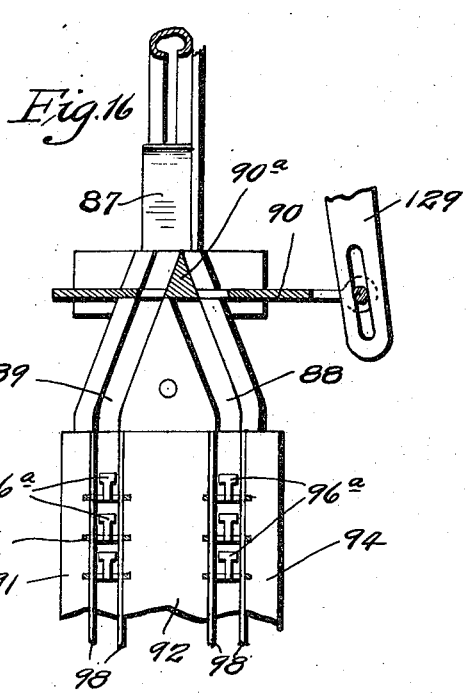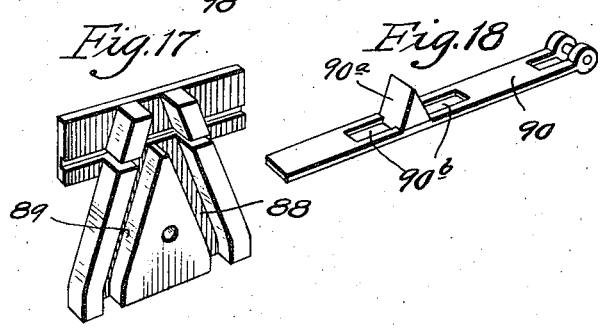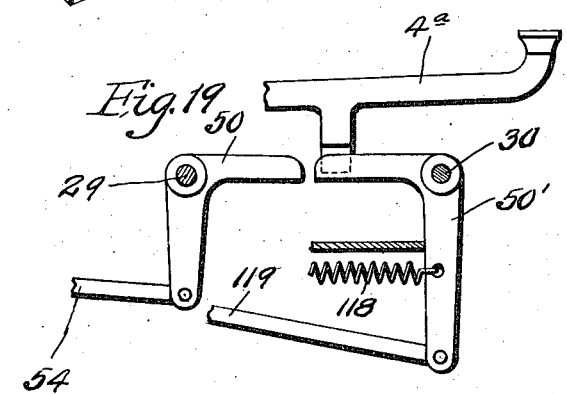

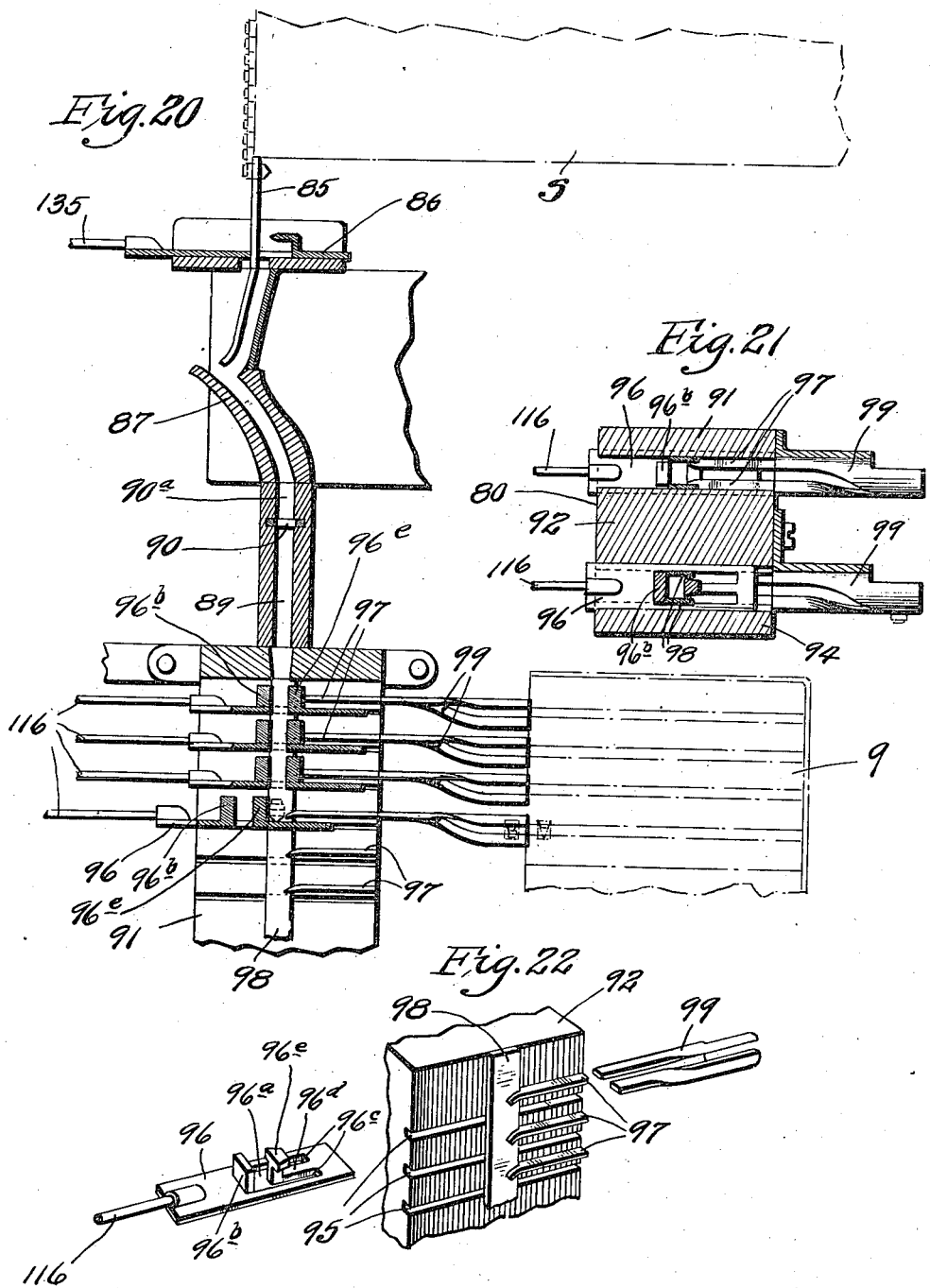

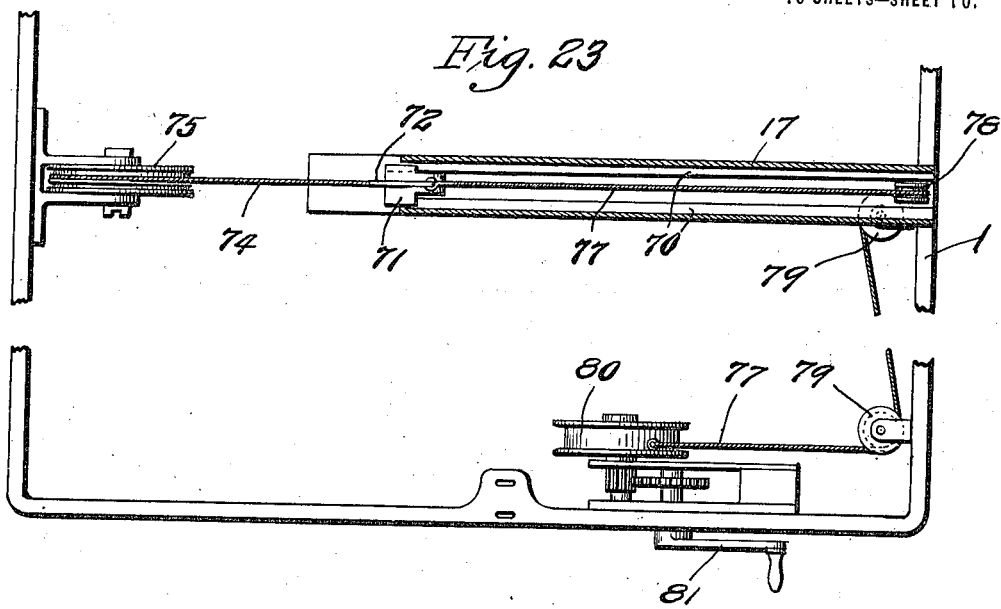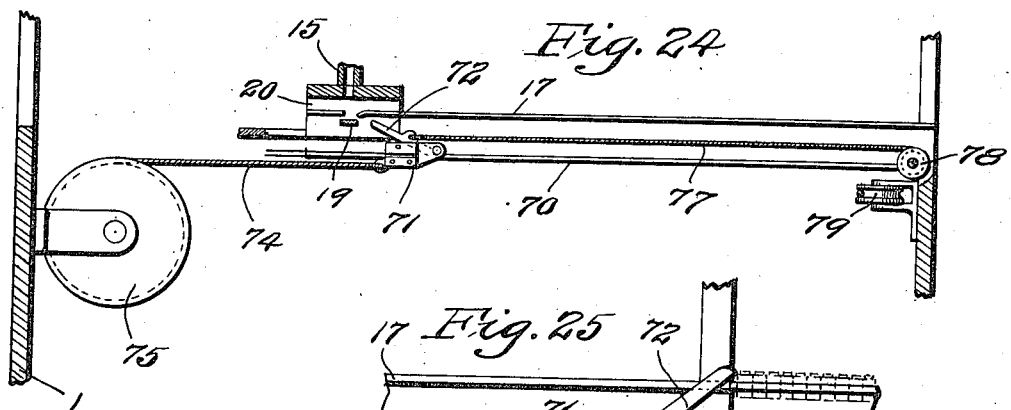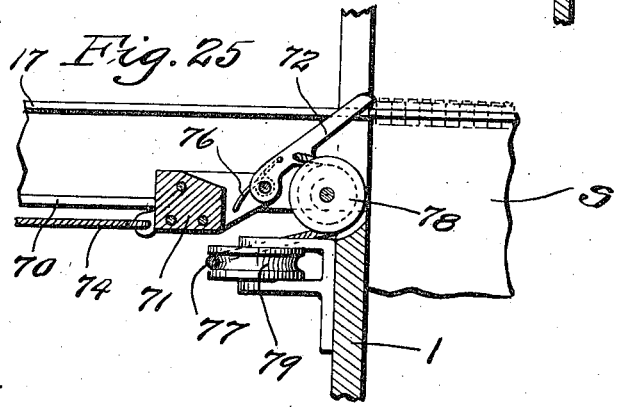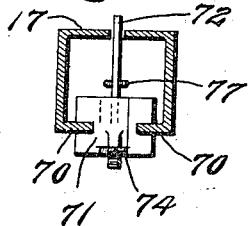

UNITED STATES PATENT OFFICE.

WILBUR C. SMITH, OF ST. LOUIS, MISSOURI, ASSIGNOR OF ONE-HALF TO BURDETTE C. LUTZ, OF JEFFERSONVILLE, INDIANA.

TYPE SETTING AND DISTRIBUTING MACHINE.

1,279,469.

Specification of Letters Patent. Patented Sept. 17, 1918.

Application filed November 3, 1916. Serial No. 129,382.

*To all whom it may concern:*

Be it known that I, WILBUR C. SMITH, a citizen of the United States, residing at the city of St. Louis, State of Missouri, have invented a certain new and useful Improvement in Type Setting and Distributing Machines, of which the following is a full, clear, and exact description, such as will enable others skilled in the art to which it appertains to make and use the same, reference being had to the accompanying drawings, forming part of this specification.

This invention relates to a machine for setting or assembling type in composed form, and for distributing type for future composition. It is of a sort wherein the selection of the type in both composing and distributing is dependent upon the volition of the operator, and the operation of the machine for the selection and handling of the type is rendered effective through the operation of keyboard mechanism.

The invention is particularly adapted to the handling of short grooved type of the sort customarily employed in the machine commercially known as the multigraph, and it is in connection with such use that the invention is herein illustrated and described.

As is well known in the art, in printing from individually movable type, it is necessary to go through a process of selection and assembly to make the suitable composition, and to go through a process of selection and distribution from type in composed form in order that the type may be properly assorted and made rapidly accessible for subsequent composition. In present practice, a familiar use of type of the sort described is made in the machine commercially known as the multigraph which is designed for operation and use in business offices or establishments not devoted primarily to the business of printing. The type commonly employed in such machines is quite short and not readily manipulated by hand. The broad purpose of my invention, consequently, is to provide a machine capable of rapid and facile manual operation whereby type may be assembled in composed form and placed in the device which retains it in the printing operation, and whereby type may be distributed directly from the printing device into suitable supply or magazine compartments in proper position for subsequent setting operations.

The principal object of my invention is to provide a type setting and distributing machine wherein both operations are controlled from a manually-operable keyboard, and the manipulation of the type is rapid and positive.

Another object is to provide such a machine wherein the amount of mechanical handling to which the type is subjected is reduced to a minimum, and thereby the possibility of injury to the type is largely obviated.

A further object of the invention is to provide a mechanism of the sort specified which is operable in both setting and distributing operations through a keyboard arrangement conforming to the standard typewriter keyboard arrangement, by virtue of which provision the machine is susceptible of accurate and rapid operation by an operator practised in typewriter operation.

Further objects reside in the provision of the mechanisms for the several operations and purposes hereinafter described.

Other and further objects will be obvious or pointed out hereinafter.

In general, the machine comprises means whereby the types are selectively released, one at a time, from compartments in which they are properly assorted, and are conveyed and guided in the proper order into a stick or lining channel in composed form, from which channel they are moved, a line at a time, into the device which contains them during the printing operation. From this container, after the composed matter has been utilized for printing, the types are released, one at a time, through keyboard operation, selectively assorted, and deposited in proper position in a suitable magazine which may be disposed in the machine for subsequent setting operations.

In the accompanying drawings, I have shown, for the purpose of illustration, one embodiment of my invention, the same comprising a machine designed for the setting and distributing of short grooved type.

In these drawings—

Figure 1 represents a top or plan view of the machine with the casing removed;

Fig. 2 is a front elevation with the casing removed and parts broken away to disclose other parts to the rear thereof;

Fig. 3 is a sectional elevation taken approximately on line 3—3 of Fig. 1;

Fig. 4 is a longitudinal section through the lower portion of the machine and showing the keyboard and its associated parts;

Fig. 4ª is a detail illustrating a part of the same in an altered position;

Fig. 5 is a longitudinal section through the upper portion of the machine;

Fig. 6 is a vertical section through a portion of a type magazine;

Fig. 7 is a detail illustrating a device for retaining the type in the magazine;

Fig. 8 is a detail illustrating the upper extremities of the setting channels;

Fig. 9 is a detail partly in section illustrating the lower portion of the setting channels;

Fig. 10 is a perspective illustrating the guides and associated selecting pallet of the setting mechanism;

Fig. 11 is a detail illustrating a feature of the copy indicator;

Fig. 12 is a fragmentary top view partly in section of the pallet mechanism and guides at the upper ends of the setting channels;

Fig. 13 is a plan detail illustrating the composing stick and its associated parts;

Fig. 14 is a detail showing the lower extremity of the common setting channels;

Fig. 15 is a detail illustrating a side view of the distributing column;

Fig. 16 is a detail illustrating the upper portion of the distributing column and particularly the upper and lower case switching device;

Fig. 17 is a perspective illustrating the upper and lower case switching guides at the upper end of the distributing column;

Fig. 18 is a perspective illustrating the switching valve for the upper and lower case distribution;

Fig. 19 is a detail illustrating the case shift key mechanism;

Fig. 20 is a transverse sectional elevation of the upper portion of the distributing column showing the association of the printing segment and the magazine therewith;

Fig. 21 is a cross section of the distributing column;

Fig. 22 is a fragmentary perspective illustrating the distributing guides and an associated selecting valve;

Fig. 23 is a cross section illustrating the mechanism for moving a line of composed type from the composing stick to the printing receptacle;

Fig. 24 is an elevational section of the same;

Fig. 25 is a detail of the traveler in said mechanism;

Fig. 26 is a cross section through the composing stick.

Referring to the illustrations by the characters of reference, let it be understood that 1 represents suitable casing or frame parts designed to house and support the various portions of the mechanism. Upon certain of the frame members is mounted a shiftable keyboard frame 2 which is movable forwardly and rearwardly to selective positions for the purpose hereinafter described. This shiftable keyboard frame carries the manually manipulative key members 4 the levers of which coöperate with a universal bar 5.

The machine, for the purpose of description, may be divided into three sections, the type-setting section, the type-distributing section, and the operating section, which latter is common to the setting and distributing sections.

I will now describe the type-setting section, making reference to Figs. 1, 2, 5, and 8 to 14 inclusive. Extending transversely between the side frames 1 in the front portion of the machine, are the transverse frame members 6 and 7 which support the upper portions of the type-setting channels and the type-separating devices, the component parts and relationship of which will be best understood by reference to Figs. 8, 10 and 12. The extreme upper portions of the guide channels are formed of the members 8 which are alined transversely of the machine and separated from one another by a space just sufficient to receive the grooved portion of a type of a sort for which the machine is designed. These members 8, therefore, form a series of vertical grooves or slots down which the type may feed, while being retained in the intended position, viz., stacked on its side. The type is designed to be fed into these grooves or channels from a suitable magazine 9 (see Figs. 2 and 5) which is formed with similar grooves into which the type is assorted, and which are disposed to register with the grooves formed by the members 8, when the magazine is disposed in setting position, as illustrated in Figs. 2 and 5.

Immediately below the channel members 8, are turning members 10 (see Fig. 10) which form grooves which turn from the front of the machine to the right of the machine through an angle of 90°. At the upper extremities of the turning members 10, the grooves therein aline with the grooves between the members, and at the lower extremities of the turning members 10 the grooves register with the guiding grooves of the arcuate setting channels. The latter are formed of a series of generally vertically extending arcuate partition members 12 intermediate of which are disposed the guiding members 14, a pair of said guiding members being disposed intermediate each two adjacent partition members, and being spaced apart longitudinally of the machine to form type-receiving and transmitting grooves, as will be understood from Fig. 10. These grooves face toward the right of the machine, and extend uninterruptedly from the lower extremities of the turning members 10, down to a channel member 15 which is formed with a common chute or channel portion 16 at which the guide members 14 and partition members 12 terminate, their lower extremities being spaced apart from the bottom of the chute portion 16 by a distance sufficient to receive the width of the type. The common channel member 15 slopes downwardly at a sharp angle from the right hand side of the machine toward the left hand side, and the guide members 14 and partition members 12 meet it substantially at right angles.

As will be best observed in Figs. 5 and 12, there are two series of the channel members 8, turning members 10 and guiding members 14, arranged one in front of the other, and designed for the reception and transmittal respectively of upper and lower case type. Accordingly, the common chute member 15 has two grooves 16, one for the reception of type from the upper case guides, and the other for the reception of type from the lower case guides. As is observed in Fig. 14, these two channels 16 converge and join at a point near the lower extremity of the common chute member 15. Thence the groove continues vertically to the composing point of the machine. The composing point, as best shown in Figs. 9 and 13, is formed by the intersection of this vertical channel or chute portion, and the composing stick or lining guide members 17. The latter are horizontally extending plates or bars of proper thickness to fit in the top and bottom grooves of the type, and are so assembled relative to each other as to form a slot in which the type may be assembled in composed form and properly retained. These lining guides terminate at the adjacent side of the vertical chute, while a pair of similar short guides 18, which terminate adjacent the opposite side of the vertical chute, coöperate with them to form a receiving pocket which will hold type received from the vertical chute portion in position with its top and bottom grooves in alinement with the members 17. When in this position, the type rests upon a receiving plate 19, and between walls 20 spaced apart longitudinally of the machine the proper distance to coöperate respectively with the top and bottom of the type.

The devices for handling the type in its separation from the assorted column, and during its transmittal to the composing stick, include first the selecting valve or pallet 21. One of these valves is arranged to control the release of type into each setting channel, and the valves are carried in slideways 22 supported on the transverse framing members 7. Each valve is formed with a slot 21$^a$ of size sufficient to permit the passage of a type sidewise therethrough, and extending longitudinally over a portion of said slot is a separating finger 21$^b$, which finger extends in the direction in which the valve is moved to release a type. Each valve is spring-pressed so as to normally occupy a position across the slot formed by the members 8, thereby forming a retaining member which supports the superadjacent column of type. The lower extremities of the members 8 are bifurcated, (see Fig. 10), so that they may pass through the slots of the valves 21, and maintain the unbroken continuity of the parts upon which the slotted portions of the type travel. The separating finger 21$^b$ lies above the type-supporting portion of the valve 21 by a distance just sufficient to receive the width of a type, and the forward extremity of the separating finger 21$^b$ lies to the rear of the forward edge of the slot 21$^a$ by a distance somewhat less than the length of a type. Consequently, when the valve is moved forwardly to release the lowermost type, which rests thereon while being retained by the guide members 8, the separating finger 21$^b$ will be moved under the next superadjacent type so that, by the time the lowermost type is released to fall through slot 21$^a$, the column of type thereabove will be supported on the separating finger 21$^b$. When the valve is returned under pressure of its spring, the portion of the valve forming the forward edge of the slot 21$^a$ will be interposed below the column of type before the latter is released from the separating finger 21$^b$. In this fashion the types are separated one at a time from the assorted columns in the magazine.

As the type is released by the valve, and falls through the slot 21$^a$, it is guided by the bifurcated portions of the members 8 down to the associated turning member 10. Due to the spiral shape of the guiding groove in the turning member 10, the type which to this point has been lying on its right side with its printing face toward the front of the machine, is turned through an arc of 90° so that the printing face is toward the right side of the machine, and the type grooves toward the front and back of the machine. After being so turned, the type continues to fall under the influence of gravity, being guided by the arcuate guiding members 14, which turn the type through a vertical arc of about 45° from the time it leaves the turning members 10 until it reaches the common chute member 15. At the terminii of the arcuate guiding members 14, the type is released into the channel 16, being deposited on its side in said channel, with its face directed upwardly and its beveled rear end directed downwardly. The lower extremities of the partition members 12 are slightly beveled, as illustrated in Fig. 9, so as to have immediate engagement with the type as soon as it is released from the guide members 14. The release of the type into the channel 16, of course, causes a change in its direction of movement, so that instead of moving sidewise and toward the right of the machine, it is now moving rearwardly and toward the left of the machine.

At the point of junction of the lower and upper case guiding channels 16, as illustrated in Fig. 14, is pivoted a light switch point member 22 of proper length to close either one of the channels 16. A type falling through one of said channels upon coming into contact with this switch point member 22, will swing the switch point member to close the other channel and form a guide for the traveling type which will prevent its lodgment in the angle or Y at the point of junction of the two channels. After passing this switch point member, the type falls through the vertical portion of the channel space bounded by the walls 20, the receiving plate 19, and the extremities of the guiding members 17 and 18. The type falls with its rear end upon the receiving plate 19, and with its top and bottom grooves alined with the guiding members 17. While in this position, the type may be ejected, as in case it is not the proper letter, by operation of the mechanism illustrated in Fig. 13. In this figure, it will be seen that the receiving plate 19 is provided with an aperture 19ª normally lying in front of the front wall 20. While the type is lying upon the plate 19, the latter may be moved rearwardly by depression of key 24, so that the aperture 19ª will be brought under the type, and the type permitted to drop therethrough. In case it is not necessary to eject the type in this manner, (which, of course, is an abnormal operation,) the type while resting on plate 19 is engaged by an advancing plunger 25 which slides on guiding members 18 and is operated in the manner hereinafter to be described, and is pushed thereby onto the stick guide members 17. After this movement has been effected, the plunger 25 is retracted to the left side of the composing point.

The mechanism for operating these type manipulating parts will be best understood by reference to Figs. 4, 5 and 13. It has been explained above how the manually manipulative keys 4 together with their levers, are carried in a slidable frame 2 which may be adjusted longitudinally of the machine frame. Each key lever has a depending arm 26 which is arranged to coöperate selectively with a setting bell crank lever 27 or a distributing bell crank lever 28. There is a series of each sort of these levers, the setting levers being pivoted on a rod 29 extending transversely of the machine, and the distributing levers being pivoted on a rod 30 similarly arranged in the machine, and in front of the rod 29. From each of said setting bell crank levers 27, extends rearwardly a connecting link 31 which is arranged for coöperation selectively with an upper case setting lever 32 and a lower case setting lever 34, a series of the former being pivoted on a rod 35, and a series of the latter being pivoted on a rod 36. Each upper case setting bell crank 32 has a laterally extending pin 37, from which extends downwardly a guide 38, and each lower case setting bell crank 34 carries a similar laterally extending pin 39 from which extends upwardly a guiding arm 40. The pin 37 on the upper case bell crank is above the line between the pin 39 of lower case bell crank and the pivot point 41 of connecting rod 31. Connecting rod 31 is formed with two abutments, one, indicated at 42, being arranged for coöperation with the pin 37, and the other, indicated at 44, being arranged for coöperation with pin 39. In Fig. 4, the keyboard is shown in position for the distributing operation, while the position of certain parts for the setting operation is shown in dot and dash lines. In the setting operation, it will be observed that the depending arms 26 of the key levers are disposed for coöperation with the upper arms of the setting bell cranks 27. Upon depression of a key, the associated setting bell crank 27 will be rocked on its pivot 29, and connecting rod 31 thrust rearwardly. With the rod 31 in the position shown in Fig. 4, wherein abutment 44 is in engagement with pin 39, lower case bell crank 34 will be rocked, so that pull rod 45, which is connected to its upper arm, will be moved downwardly. This movement of pull rod 45, as will be understood by reference to Fig. 5, will swing an associated valve operating lever 46 and move its associated type separating valve 21, which is of the lower case series, to release a lower case type in the manner above described. The valve operating levers 46 are pivoted on a rod 47, and each lever is under the influence of a spring 48 which maintains the lever, and consequently the valve, in normal position.

If the position of thrust rod 31 is such that abutment 42 is in engagement with pin 37, upper case bell crank 32 will be rocked upon rearward movement of connecting rod 31, and its associated pull rod 49 will be drawn downwardly to rock an associated valve operating lever 46' which in turn controls a type-separating valve 21 of the upper case series.

The means for selectively positioning connecting rod 31 so that it will coöperate with lower case bell crank 34 or upper case bell crank 32 as desired, includes the shift key 4ª (see Fig. 19) which coöperates with the setting shift key bell crank 50 when the keyboard is in setting position, and which is adapted to rock said bell crank and operate it. Mounted to move vertically in guides 51 at the opposite sides of the machine, is a guide plate 52 slotted for the reception of the connecting rods 31. This guide plate 52 may be shifted vertically in its guideways 51 upon operation of setting shift key bell crank 50 in the manner above described, through the intermediation of a thrust rod 54 operated by the last mentioned bell crank, and levers 55 operated by the thrust rod 54. The normal position of connecting rods 31 is that illustrated in Fig. 4, wherein abutment 44 is in coöperative relationship to pin 39, so that operation of any of the setting bell cranks 27 will cause the operation of lower case separating valves. Upon depression of shift key 4ª, however, guide plates 52 will be lifted by virtue of the connections just described, to bring abutment 42 into engagement with pin 37 and abutment 44 out of engagement with pin 39, so that operation of any letter key will effect the release of an upper case letter.

It has been explained above how, after the release of a type, it is conveyed and guided to composing position in front of the stick guides 17, and how from this position it is moved onto the guides by the plunger 25. The operation of this plunger is derived from the key bars through the universal bar 5, with which all the key bars (with the exception, of course, of the shift key bar) have coöperation. Upon depression of a key bar, universal bar 5 is rocked downwardly, and being supported at its ends by means of arms 56 from rock shaft 57, such downward movement of the universal bar will partially rotate shaft 57 on its axis. Rock shaft 57 carries two arms, numbered 58 and 59. The latter operates a portion of the distributing mechanism hereinafter to be described, while the former carries a thrust rod 60. This thrust rod (see Figs. 4 and 13) has slidable connection with the arm 61 carried on a stub shaft 62 which at its other end carries an arm 64. A short pivoted link 65 connects plunger 25 with arm 64. The sliding engagement of rod 60 with arm 61 is to permit the forward and rear adjustment of the keyboard, in which adjustment, of course, the universal bar, and all parts connected thereto, are moved. The operative connection of thrust rod 60 with arm 61 is by means of the stop member 66.

When the universal bar 5 is rocked downwardly by operation of the key, through the connection of arm 58, the thrust rod 60 will be thrust rearwardly and arm 61 swung rearwardly through the engagement of stop member 66. This will swing arm 64 to the right and propel plunger 25 to the right to engage the type resting on plate 19 and push it onto the stick guides 17. The plunger 25 and parts connected thereto, are returned to normal position by spring 67, so that the type released upon the initial depression of the key will be received upon the plate 19, where it will rest until the next operation of a letter key, when it will be pushed onto the stick guides by the plunger 25.

From the foregoing, it will be understood how, in the type-setting operation, the types are released and set in the regular order in which the letters appear in the copy, suitable space blanks being set in the spaces by operation of the space keys, and the selection of upper and lower case letters being made by operation of the shift key. One by one, in the order set, the types are assembled in the composing stick made up of the members 17, from which they are transposed into the printing retainer or cylinder of the printing machine. As will be understood by reference to Figs. 2 and 25, the printing segment or cylinder is supported at the right side of the machine with a type-receiving slot in alinement with the type-receiving slot in the composing stick. When a line of type has been assembled in the stick, a transposing mechanism is operated to slide the line of type from the composing stick into the alined slot of the printing cylinder. This transposing mechanism is illustrated in Figs. 23 to 26 inclusive. Slidably mounted on guides 70 below the composing stick guides 17 is a traveling block 71 upon which is pivotally mounted a sweep member 72. The block is normally held in retracted position at the left hand extremity of the composing stick by the tension of a spring which winds a flexible connection 74, which is attached to the block 71. The sweep member 72 is normally held in retracted or leftward position, as illustrated in Fig. 24, under the influence of a spring 76. When the sweep member 72 is swung rightwardly, however, its upper end passes forwardly between the guides 17, in position to engage the left hand end of the type supported thereon. From the sweep member 72 there extends a flexible member 77, which is carried to the right to a sheave 78, and then guided to the forward portion of the machine by a sheave 79. Its other extremity is attached to a winding drum 80, which is suitably operated by a crank 81 to wind the flexible member 77 thereon. This traction upon the flexible member 77 operates to swing the sweep member 72 up into engagement with the type at the left hand extremity of the composing stick, and then to draw the block 71 along on its guides 70 toward the right. This movement sweeps the line of type to the right upon the guides 17, and out into the guide of the printing cylinder, which is illustrated at S. When one line in the printing cylinder has been thus filled, the latter may be rotated in any convenient fashion to bring the next type-receiving slot into alinement with the stick for reception of the next line of assembled type.

The type-distributing mechanism, which will now be described, includes means for separating the individual types assembled in the printing cylinder in the manner above described, from one another, and assorting and reassembling them into proper storage retainers in a suitable magazine, in proper position for a subsequent setting operation.

The type-distributing mechanism will be understood best by reference to Figs. 1, 3, 5, and 15 to 22 inclusive.

The type-distributing mechanism is supported in the machine frame to the rear of the type-setting mechanism. Its supporting portions include the assorting column 80 (see Fig. 3) and a pair of parallel slanting lever supports 81 supported from the assorting column by a transverse brace member 82 and from the frame by a bracket 84.

The type-distributing mechanism includes first, a separating mechanism, second, an assorting mechanism, and third, a type-depositing mechanism. The separating mechanism will be best understood by reference to Figs. 16 and 20. At the top of the machine means is provided for mounting the printing cylinder S resting on its right hand end and with its type grooves extending vertically. The arrangement of the cylinder is such that the type grooves may be turned to aline with a groove formed by guide members 85 (see Figs. 15 and 20) into which latter groove type from the alined slot of the printing cylinder will feed by gravity. The feed of type along the guide members 85 is controlled by a separating valve 86, which is similar in construction and operation to one of the separating valves 21 of the type-setting mechanism. This valve 86 is operable by means hereinafter to be described, to separate and release type fed downwardly from the printing cylinder, one at a time, to permit their proceeding into the separating channel 87. The types travel down the guides 85 with the right hand sides down, and with their top and bottom slots riding on the guides 85. The lower extremities of the guides 85 terminate short of the lower sloping side of the assorting channel 87, so that, when the type is deposited in the channel, it is freed from the guides 85, and allowed to slide down the channel rear end first. Shortly below the terminus of the guides 85, the assorting channel 87 divides (see Figs. 16 and 17) into an upper case assorting channel 88 and a lower case assorting channel 89, the former branching toward the front and the latter toward the rear of the machine. The feed of type into these channels is controlled by a case switching valve 90. This switching valve 90 is shiftable across the channels 88 and 89, and has a block portion 90$^a$ adapted to close either channel selectively, and to form a wall portion of the unclosed channel. The valve 90 is provided with aperture 90$^b$, one at each side of the block member 90$^a$, which apertures are adapted to register with the respective channels, when they are open, so as to permit the feed of type past the switching member. By the proper setting of this switching member, which is accomplished by mechanism hereinafter to be described, lower case type are diverted into the lower case assorting channel, and upper case type into the upper case assorting channel, which continue down the distributing column.

The distributing column is made up primarily of the vertically extending bar members 91, 92 and 94. These members are spaced apart from front to rear of the machine, and are grooved transversely to provide seats 95 for the assorting pallets 96. The assembly of the assorting pallets 96 with the bar members 91, 92 and 94, divides the space intermediate the bar members into a series of relatively vertically disposed stages. There is a pallet, and hence a stage, for each type character which the machine is designed to handle, and into each stage intermediate the juxtaposed pallets extends a pair of type guides 97.

Each pallet, as will be understood by reference to Fig. 22, includes a horizontally disposed plate member which is pierced with an aperture 96$^a$ which treminates at one end at a guide member 96$^b$ and at the other end in a pair of slots 96$^c$ separated by a receiving tongue 96$^d$ and a pressing member 96$^e$. The guide member 96$^b$ and pressing member 96$^e$ are spaced apart longitudinally of the pallet a distance equal to the width of the type channel, viz., a distance slightly in excess of the width of a type, and when the pallets are in normal position in the assorting column, the guide members 96$^b$ form the left hand wall of the type channel, and the pressing members 96$^e$ form the right hand wall thereof. The front and rear walls of the type channels are formed by the strips 98 which are inserted through the apertures 96$^a$ and behind the extremities of the guides 97, as will be understood by reference to Fig. 21. These strips 98 cross the seats 95, and aline with the slots 96ᵉ of the pallets. At the right hand extremities of the guides 97 are arranged turning members 99, which substantially form continuations of said guides, but are turned through an angle of 90° from the horizontal toward the front of the machine. When the pallets 96 are in normal position, the apertures 96ᵃ are in alinement vertically, so that an uninterrupted channel is provided for the passage of type downwardly from the switching member 90. However, a type in its progress down this channel may be stopped in any stage opposite a pair of the guides 97, by the retraction of the associated assorting pallet leftwardly to the position of the lowermost pallet illustrated in Fig. 20. In this position the pressing member 96ᵉ is drawn to the left of the type channel, and the receiving tongue 96ᵈ is interposed across the channel to receive the falling type. The type falls with its rear end upon this receiving tongue 96ᵈ, and is held upright by the pressing member 96ᵉ which engages its left side, the strips 98 which engage its top and bottom, and the extremities of the guides 97 which engage its right side. In this position, the top and bottom grooves of the type are alined with the guides 97, and when the pallet 96 is released so as to resume its normal position, which it does under spring pressure, the type will be pushed onto the guides 97 by the pressure from the pressing member 96ᵉ.

The arrangement of the outer extremities of the turning members 99 is such that they will register with the type-receiving channels of the type magazine 9, when the latter is disposed in a vertical position at the right hand side of the machine, and the connections of the assorting pallets 96 to the keys in the keyboard correspond to the order of the keyboard connections to the separating valves 21, i. e., if the separating valves in their order from left to right are operated respectively by the keys Q, A, Z, etc., the keyboard attachments of the separating pallets 96 would be such that the pallets in their order from top to bottom would be operated respectively by the same keys, viz., Q, A, Z, etc. Consequently, the end of the magazine which is at the left of the machine when in setting position, being at the top of the distributing column when in distributing position, the type will be assorted, by operation of the keyboard, into the same magazine compartments that it is dispensed from in the setting operation.

The mechanism for selectively operating the assorting pallets and the case switching member will be understood by reference to Figs. 1, 3, 4, 5, 15, 16, 19 and 20. Referring to Fig. 4, it will be understood that when the keyboard frame 2 is in the distributing position, i. e., the forward position, which is shown in full lines in that figure, the depending arms 26 of the key bars are disposed for coöperation with the distributing bell cranks 28. From each distributing bell crank 28, a connecting rod 100 forms a means of operative connection with an upper case distributing bell crank 101 or a lower case distributing bell crank 102, a series of the former being pivoted on a rod 104, and a series of the latter being pivotally supported on a rod 105. The operative connection between each upper case distributing bell crank 101 and its associated connecting rod 100, is by means of the laterally extending pin 107 on the former and the abutment 108 on the latter adapted to engage the pin. Similarly, the operative connection between the rod 100 and the associated lower case bell crank 102, is by virtue of a laterally extending pin 109 carried by the bell crank and abutment 110 on the rod. When the rod 100 is in the position illustrated in Fig. 4 with the abutment 110 in operative disposal relative to the pin 109, the lower case bell crank will be operated when the associated distributing bell crank 28 is swung, while, when the rod 100 is lifted to the position illustrated in Fig. 4ᵃ with the abutment 108 in operative disposal relative to the pin 107, the upper case distributing bell crank 101 will be operated upon operation of the associated distributing bell crank 28. Each upper case distributing bell crank has a pull rod 111 extending up to a lever 112 pivoted on the forward one of the members 81, and each lower case distributing bell crank 102 has connection with a similar pull rod 114 extending up and into operative connection with a lever 115 pivoted on the rear one of members 81. From each of levers 112 and 115, extends forwardly a pull rod 116 to one of the assorting pallets 96, those from levers 112 leading to assorting pallets in the upper case column, and those from levers 115 leading to pallets in the lower case assorting column.

By virtue of this arrangement of parts, whenever a key 4 in the keyboard is operated the associated distributing bell crank 28 will be thrown to operate the case bell crank which may be operatively connected thereto by the rod 100, from which case bell crank the movement will be transmitted through its attached pull rod 111 or 114, as the case may be, and thence through the associated bell lever and pull rod 116, to the associated assorting pallet, to move said pallet to close the type-distributing channel in the manner hereinbefore described. Upon release of the key, the parts are restored to normal position by the spring 117 and spring 118.

The means for shifting the operative connection between a letter key and an upper or lower case distributing bell crank selectively, includes, in the first place, the shift key 4ª (see Fig. 19) which is arranged for coöperation with a distributing shift bell crank 50', from the weight arm of which extends the connecting rod 119. The latter leads to an arm 120 on a rock shaft 121, which rock shaft in turn carries a pair of arms 122 connected by suitable links or hangers 124 to a guide plate 125 in which the rear ends of the connecting rods 100 are slidably mounted. The guide plate 125 is mounted for vertical sliding movement in guides 126, and when lifted to its upper position by the rotation of rock shaft 121, will lift abutment 110 out of coöperative disposal relative to pin 109, and abutment 108 into coöperative disposal relative to pin 107. Inasmuch as all of the connecting rods 100 are thus shifted when the shift key is depressed, the manipulation of any letter key will effect the operation of an upper case assorting pallet. In normal position of the shift key and guide plate 125, manipulation of a letter key will produce the operation of the associated lower case assorting pallet.

Simultaneously with this shift of operative connections between the letter keys and the upper and lower case assorting devices, is accomplished a shift of the case switching member 90, in order that the selected type may be guided into the proper case channel. This means of operating the switching member 90 will be understood upon reference to Fig. 15.

Carried on rock shaft 121 is an arm 127 to which is connected a pull rod 128 which extends upwardly into operative engagement with bell lever 129. This bell lever has operative connection with the case switching member 90, so that, when rock shaft 121 is rocked by the depression of the shift key, case switching member 90 will be pushed rearwardly to close the lower case channel 89 and open the upper case channel 88, so that the type released by the separating valve will be diverted into the latter.

Upon every operation of a letter key, and likewise of the space key, a type is released from the column or line above the separating valve 86, and allowed to fall through the distributing channel, as above described. The means for operating the separating valve 86 to effect this operation will be understood by reference to Figs. 3, 4 and 20. Referring first to Fig. 4, it will be understood that upon the depression of any letter key, or the space bar, the rock shaft 57 will be rocked, due to the depression of the universal bar 5 by the lever of the key operated. From the arm 59 carried by the rock shaft 57, extends a pull rod 130, which is arranged for operative connection to the lever 131. A rod 132 extends upwardly from the weight arm of lever 131 to another bell crank 134 pivoted adjacent the upper portion of the machine, and a rod 135 extends from the latter bell crank to the separating valve 86. Hence, whenever universal bar 5 is depressed, bell cranks 131 and 134 will be rocked, and due to the interconnections, the separating valve 86 will be operated to release the lowermost type of the superimposed column.

In the operation of the above described parts for the purpose of distributing type, it will be understood that the printing holder or cylinder is disposed on top of the machine with its right hand end down, and with a line of type in alinement with the groove formed by the guides 85. When this line of type is released from the carrier, it will fall until the lowermost type comes into engagement with the separating valve 86. The magazine is disposed at the side of the machine with its left hand end up and with its type-receiving channels in register with the channel at the outer extremities of the turning members 99. The keyboard frame is disposed in its forward position so that the arms 26 are in operative relationship with the distributing bell cranks 28. The operator now proceeds to manipulate the keys one at a time and in the regular order in which the keys would be operated in spelling out the composed matter which is being distributed. The types are released one at a time by the separating valve, guided into the upper or lower case distributing channel, according to the position of the shift key, stopped opposite the guideways leading to the magazine compartment assigned to the particular character, and then moved on to the said guideways and toward the magazine. The feed of subsequent type onto the compartment guideway pushes the type ahead of it into the receiving channel in the magazine, with said type in proper position for a subsequent setting operation in the manner before described.

When the type has been assorted and deposited into the magazine, the channels of the latter are closed to prevent the egress of the type by means of the arrangement illustrated in Figs. 5, 6 and 7. This includes a pair of comb-like gate members 136 which are rotatably mounted in the magazine 9, extending longitudinally thereof and with the stop members 137 in position to extend across the channels formed by the type guides. Any suitable means is provided whereby these gate members may be swung so as to place the stop members 137 across the type grooves, whereby to prevent the egress of the type, and to swing the gate members with the stops out of such position, so as to permit the egress of the type when the magazine has been placed in setting position. The mechanism illustrated includes the pinions 138 carried on the ends of the gate members 136, and the rack members 139 having operative engagement with said pinions and operable by a lever 140 to rotate the pinions. The rotation of pinions 138 will cause the swinging of the gate member 136 to either of the positions described. As stated above, after the type has been assorted into the magazine, the gate members 136 are swung to close the type-receiving channels, so that the magazine may be removed from the distributing column, and placed in position at the top of the machine for the setting operation. Then the gate members 136 may be swung to open position to release the type to permit it to feed down on the guide members 8.

As a matter of convenience for the operator, a suitable indicator such as that illustrated in Figs. 2 and 11 may be provided. A copy support in the form of a roller 141 is rotatably mounted in the side members of the keyboard frame, suitable paper holding fingers being arranged for coöperation therewith.

Adjacent the roller is supported a transversely extending carrier 142 upon which a traveler 144 is adapted to slide. The traveler has an indicator 145 adapted to move adjacent the copy supported on the roller 141. A ratchet 146, which is operated from the universal bar 5, is arranged to coöperate with the ratchet wheel 147 provided with a sheave 148. Upon this sheave is carried a flexible cord 149 which is attached to the traveler 144. The arrangement of the ratchet and wheel is such that the extent of feed imparted to the traveler 144 at each operation of the universal bar 5 is equivalent to one letter space. Hence, during the operation of the machine, the indicator 145 will be automatically moved to keep the place on the copy.

The mechanism above described is designed for rapid and accurate operation in both setting and distributing type. The type is set directly from the machine into the type retainer of the printing apparatus, and is distributed directly from said retainer into the type magazine. There is no intermediate mechanical manipulation of the type, and throughout its progress through the machine the printing face is guarded against any impact or wear which would be likely to injure it.

In the present application, I am not claiming features of the mechanism pertaining to the composing mechanism exclusively, or to the distributing mechanism exclusively, such claims having been regarded as directed to subject-matter divisible from claims directed to the features of the machine which render it a composing-distribution apparatus. This exclusion of the claims mentioned, however, is not to be construed as an abandonment of that subject-matter, as it forms the basis of a copending application, Serial No. 161,185, filed April 11, 1917.

While I have shown but a single embodiment of my invention, I am aware that, as hereinafter claimed, the same is susceptible of other embodiments differing in detail and arrangement from that herein disclosed for the purpose of illustration.

What I claim is:

1. In a type setting and distributing machine, the combination of a movable magazine having a plurality of alined type storage receptacles, means for supporting the magazine with said receptacles in a horizontal row, means for supporting said magazine with said receptacles one above another, means for guiding type from said receptacles in a vertical plane, means for guiding type past the ends of said receptacles in a vertical line, and manually operable means for releasing type to permit such movements by the force of gravity and to position type at the termination of such movements.

2. In a type setting and distributing machine, the combination of a plurality of composing type guides in a substantially horizontal row, a plurality of distributing type guides disposed one above another, a type magazine provided with type receiving compartments alined to register with said composing guides selectively and said distributing guides, and selectively operable manually manipulative operating means arranged for coöperation with said composing guides and said distributing guides.

3. In a type setting and distributing machine, the combination of a plurality of composing type guides disposed one beside another, a plurality of distributing type guides disposed one above another, a magazine disposed for coöperation selectively with the composing guides and with the distributing guides, selectively operable devices for controlling the movement of type on the composing guides, selectively operable devices for placing type on the distributing guides, and a manually manipulative keyboard arranged for coöperation in common with said selectively operable devices.

4. In a type setting and distributing machine, the combination of a series of composing type guides disposed one beside another, a series of distributing type guides disposed one above another, a magazine having a plurality of type receiving compartments, means for supporting said magazine to discharge type onto the composing guides, means for supporting said magazine to receive type from the distributing guides, and selectively operable means for controlling the movement of type on the guides.

5. In a type setting and distributing machine, the combination of a plurality of composing type guides disposed one beside another, a plurality of distributing type guides disposed one above another, a magazine arranged for coöperation selectively with the composing guides and the distributing guides, a receiver for type in composed relationship, means for supporting said receiver below the composing guides, means for supporting said receiver above the distributing guides, and selectively operable means for controlling the movement of the type relative to said receiver and said guides.

6. In a type setting and distributing machine, the combination of a series of composing type guides disposed one beside another, a series of distributing type guides disposed one above another, a container for type in composed relationship, operative devices for controlling the transmission of type from said container to said distributing guides, and a magazine having type receiving compartments arranged for coöperation selectively with both series of type guides.

7. In a type setting and distributing machine, the combination of a series of composing type guides disposed one beside another, a series of distributing type guides disposed one above another, a magazine having a series of type receiving compartments arranged to coöperate selectively with both series of guides, and selectively operable devices for controlling the transmission of type on said guides.

8. In a type setting and distributing machine, the combination of a series of composing type guides disposed one beside another, a series of distributing type guides disposed one above another, a receiver for type in composed relationship. means for supporting said receiver for coöperation selectively with either series of guides, and selectively operable devices for controlling the transmission of type relative to said receiver and said guides.

9. In a type setting and distributing machine, the combination of a magazine and a container each having type channels for the accommodation of alined type, means for supporting said magazine and container in interchangeable vertical relationship and with the type channels of one extending at an angle relative to the type channels of the other, type handling mechanism for controlling the interchange of type between said magazine and container, and a keyboard of manually operated keys for operating said mechanisms.

10. In a type setting and distributing machine, the combination of a magazine and a container having type channels for the support of alined type, means for supporting each of said devices with their type channels extending vertically, means for supporting each of said devices with their type channels extending horizontally, mechanisms for controlling the interchange of type between said devices when positioned with their type receiving channels in angular relationship and manually operable means for operating said mechanisms selectively.

11. In a type setting and distributing machine, the combination of a magazine and a type container each having type receiving channels adapted to retain type in alinement, said container and said magazine being relatively movable and associated with means whereby either device may be supported with its type channels extending vertically and the other may be supported with its type channels extending horizontally, means for controlling the transmission of type from the device having its channels in vertical disposal to the device having its channel in horizontal disposal, and manually operable mechanism whereby said means may be selectively operated.

12. In a type setting and distributing mechanism, the combination of a plurality of type assembling guides, a plurality of type distributing guides, and a magazine having type receiving compartments arranged for coöperation with the assembling guides and the distributing guides.

13. In a machine of the class described, the combination of a series of assembling type guides corresponding to the type characters, a series of assorting type guides corresponding to the type characters, a magazine having type receiving compartments corresponding to the type characters and arranged for coöperation selectively with both series of guides.

14. In a type setting and distributing machine, the combination with a series of composing type guides disposed one beside the other and a series of distributing type guides disposed one above the other, of a magazine having a plurality of type receiving compartments, which magazine is adapted to discharge type onto the composing guides and to receive type from the distributing guides.

15. In a type setting and distributing machine, the combination with a series of composing type guides disposed one beside the other and a series of distributing type guides disposed one above the other, of a magazine having a plurality of type receiving compartments, which magazine is adapted to discharge type onto the composing guides and to receive type from the distributing guides, and means for controlling the movement of type on the composing guides and distributing guides.

In testimony whereof I hereunto affix my signature in the presence of two witnesses, this 26th day of October, 1916.

WILBUR C. SMITH.

Witnesses:
C. S. BUTLER,
M. P. SMITH.